United States Patent [19]
Shaw

[11] Patent Number: 5,283,824
[45] Date of Patent: Feb. 1, 1994

[54] CALLING LINE IDENTIFICATION

[75] Inventor: I-Nuoh R. Shaw, Naperville, Ill.

[73] Assignee: AT&T Bell Laboratories, Murray Hill, N.J.

[21] Appl. No.: 782,703

[22] Filed: Oct. 25, 1991

[51] Int. Cl.⁵ .................. H01M 1/54; H01M 1/57
[52] U.S. Cl. ...................... 379/142; 379/201
[58] Field of Search ............ 379/142, 127, 120, 245, 379/246, 201

[56] References Cited

FOREIGN PATENT DOCUMENTS

| 2618281 | 1/1989 | France | 379/142 |
| 0213163 | 1/1990 | Japan | 379/142 |
| 0346859 | 2/1991 | Japan | 379/142 |

OTHER PUBLICATIONS

"5ESS(R) Switch Feature Handbook", AT&T Manufacturer's Manual 235-390-500, Issue 6, Dec. 1990, pp. 139-146.

"Quick Guide to AUDIX", AT&T Manufacturer's Brochure 585-302-702, Issue 2, pp. 1-6.

Primary Examiner—Stafford Schreyer
Attorney, Agent, or Firm—Werner Ulrich

[57] ABSTRACT

This invention relates to a method and apparatus for specifying alternate numbers for use as Incoming Calling Line Identification (ICLID) numbers. On a calling card call, the caller may specify whether the calling card number or the telephone number of the caller telephone station is to be used as the ICLID number. Alternatively or in addition, the caller may provide an identification number comprising a personal identification number and a telephone number and indicate that the telephone number be used as the ICLID number. Advantageously, callers may identify themselves, for the purposes of ICLID, with their home or business telephone number even when they are calling from a different telephone station.

9 Claims, 3 Drawing Sheets

CALLING LINE IDENTIFICATION

CROSS-REFERENCE TO RELATED APPLICATION

This application relates to an application by I-Nuoh Rose Shaw entitled "Use of Incoming Caller Line Identification," Ser. No. 07/783,052, concurrently filed herewith and assigned to the same assignee as this application.

TECHNICAL FIELD

This invention relates to caller identification on telecommunications calls.

PROBLEM

Incoming calling line identification (ICLID) is becoming an increasingly popular service. With ICLID the called customer receives the identification of the caller. This identification can be used by the called customer to make a conscious decision as to whether or not to answer the call or to properly prepare mentally to answer the call. In addition, ICLID, in conjunction with such services as local area signaling services (LASS) can be used for selectively completing the call for people or computer systems that wish to accept calls only from certain callers, rejecting calls for people who wish to reject calls from certain callers, to provide special alerting signals in case the call is from one of a select group of callers, or to forward calls from selected callers.

A problem arises when the caller is not at his/her home telephone. For example, if the caller is at an airport and is making a calling card call, the ICLID number that is received and used at the switching system serving the called customer is the number of the pay telephone station at the airport and not the number that is listed for the called customer's LASS services or the number that would be recognized by the called customer. Accordingly, a problem of the prior art is that ICLID service, by identifying the telephone station from which a call originates, does not present, to the called customer and the switching system serving that called customer, the information needed to properly serve a call when the caller is calling from a telephone station other than his/her home or business telephone station.

SOLUTION

This problem is solved and an advance is made over the prior art in accordance with applicant's invention wherein, in a departure from the prior art, a calling customer is provided the option of having the number of his calling station or some other number used as the incoming call line identification number (ICLID) number.

In accordance with one specific embodiment of the invention, if the customer is placing a calling card call the caller is given the option to indicate whether the calling card number or the telephone station number is to be used as the ICLID number. Advantageously, the customer may indicate the calling card number which may comprise the calling customer's home or business telephone number.

In accordance with one feature of the invention, the caller keys an identification number, such as a personal identification number, for use as an ICLID number. Advantageously, this identification number may be recognized by the called customer station or the switching system serving that customer.

DETAILED DESCRIPTION

Figure 1:
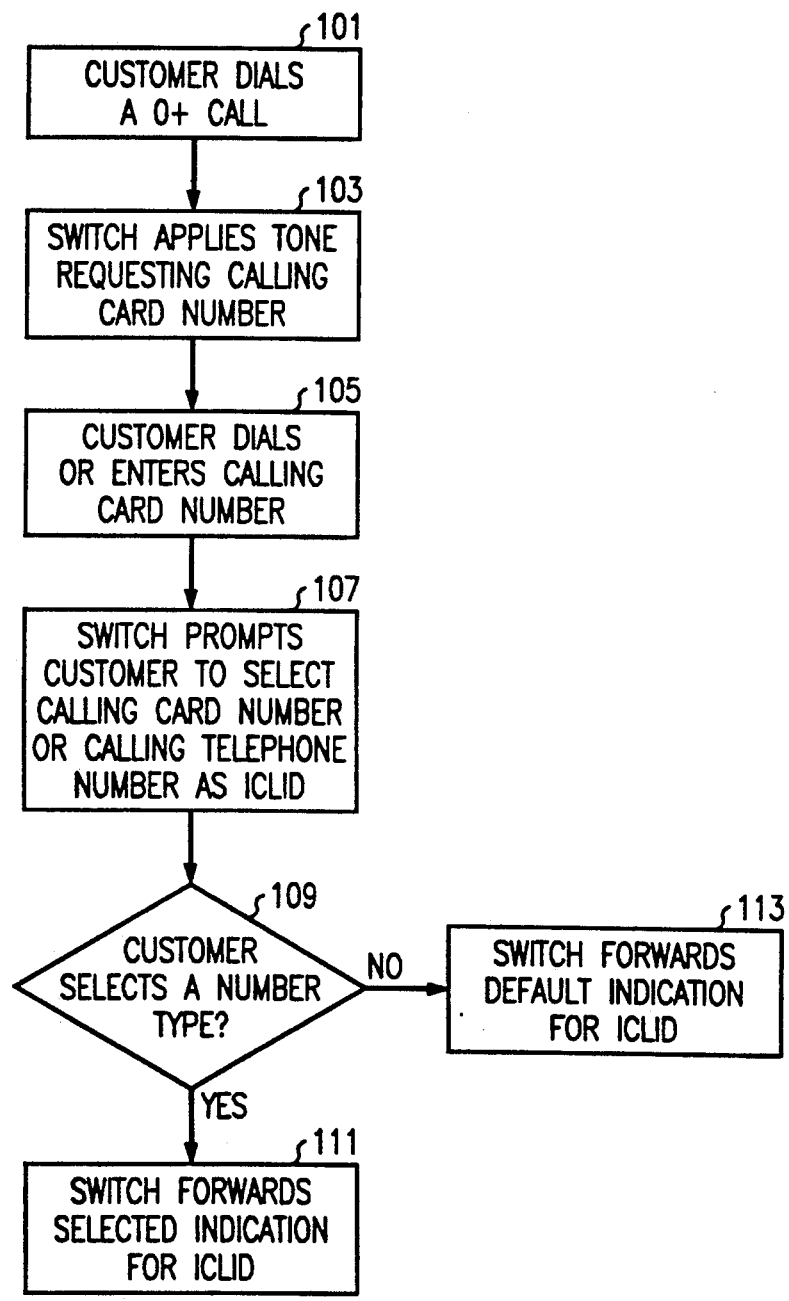
FIGS. 1-3 are flow diagrams illustrating the specification and use of alternate ICLID numbers.

FIG. 1 is a flow diagram of a method of carrying out applicant's invention. A customer dials a zero plus call (action block 101). A zero plus call is a call whose first digit is zero and whose subsequent digits are the digits of the directory number of the called customer. Responsive to receiving this dialed number, the switching system serving the calling customer applies a tone requesting the caller's calling card number (action block 103). The customer dials or enters the calling card number, perhaps through the use of a card reader (action block 105). The actions of blocks 101, 103 and 105 are well known in the prior art. In a departure from the prior art, the switch then prompts the customer to select the calling card number or the calling telephone number as the number to be used as the ICLID number by the switching system serving the called customer (action block 107). Test 109 determines whether or not the customer selects a number type. For example, the calling customer may key in "1" if the calling card number is to be used and "2" if the calling telephone number is to be used. If the customer does not reply, then the switch will use a default number (action block 113), the default number being selected by the telephone administration. While, under present practice, this default number would probably be the telephone number of the calling telephone station, as applicant's invention is implemented, it may be found desirable to use instead under the default basis the calling customer's calling card number. If the calling customer does select one of the number types, then the switch uses the selected choice of number (action block 111).

Figure 2:
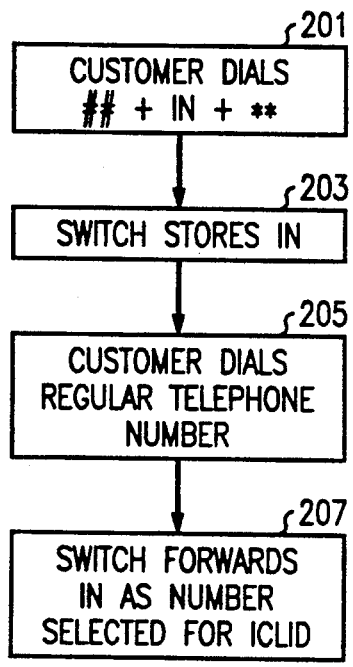

FIG. 2 illustrates the actions performed when a customer inserts a special number, such as a personal identification number, as a substitute for the directory number normally used for ICLID. As illustrated in action box 201, the customer dials a prefix such as ## before dialing an identification number (IN), such as a telephone number plus a personal identification number (PIN), and then delimits the identification number with another delimiter such as **. The switch stores the IN (action block 203) and the customer dials a regular telephone number (action block 205). The switch then forwards the IN as the number selected for ICLID (action block 207). The IN that is keyed by the customer may be a four digit personal PIN followed by a special directory number (SDN) for identifying the caller.

Figure 3:
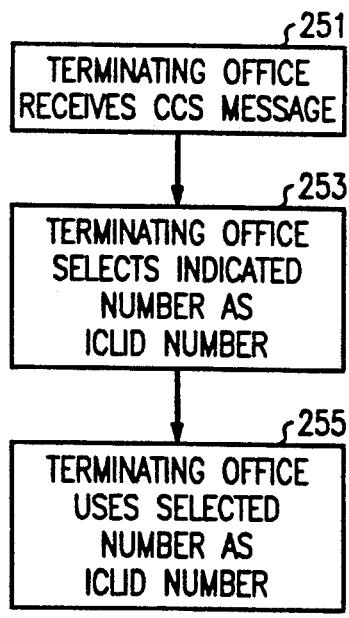

FIG. 3 illustrates what happens in the terminating switching office upon receipt of the CCS message that contains the ICLID number. The terminating office receives the CCS message (action block 251). The terminating office then selects the number indicated in the message as representing the ICLID number as the number to be used for the ICLID number (action block 253). The terminating office then uses the selected number as the ICLID number (action block 255). The terminating office uses this ICLID number for any LASS features to which the called customer subscribes and/or, as indicated in the companion patent application, for selecting an appropriate greeting message for a voice messaging system. In the special case of an identification number comprising a personal identification number and a directory number, the terminating office verifies the accuracy of the personal identification number and then uses the directory number portion of the identification number as the ICLID number.

Figure 4:
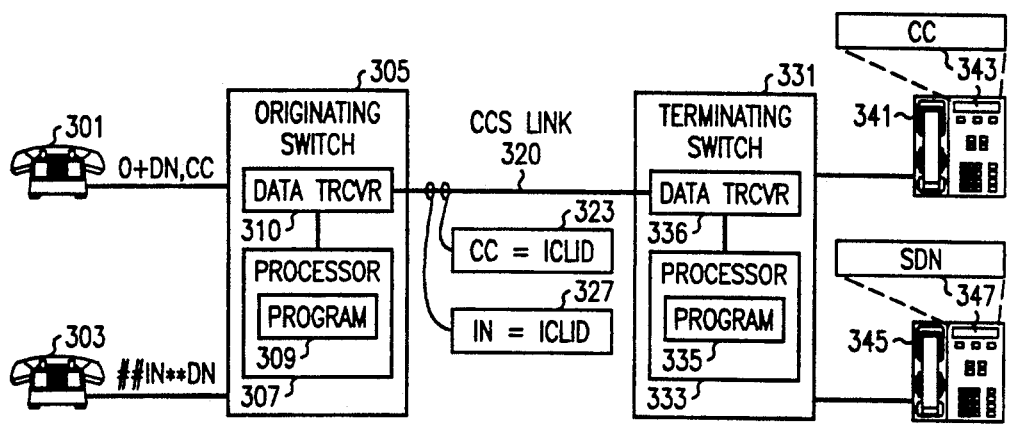
FIG. 4 is a block diagram of apparatus for using alternate ICLID numbers.

FIG. 4 is a block diagram to illustrate the invention. Two telephones, stations 301 and 303, are connected to an originating switch 305. The originating switch comprises a processor 307 operating under the control of a program 309 to execute appropriate portions of the sequences described in FIGS. 1 and 2. Originating switch 305 is connected via a common channel signaling link 320 (which may traverse one or more signal transfer points, not shown) to a terminating switch 331. The terminating switch 331 comprises a processor 333 controlled by a program 335 for executing the program specified by the flow chart of FIG. 3. The terminating switch is connected to two telephone instruments 341 comprising an ICLID display 343 and 345 comprising an ICLID display 347. If telephone station 301 dials 0 plus a directory number and a calling card number, and indicates preference for the calling card number, then the originating switch 305, using a data transceiver 310, will transmit a common channel signaling (CCS) message 323, which comprises an indicator that the calling card number is the ICLID number, over data link 320. The calling card number is then transmitted to the terminating telephone station 341. Similarly, telephone station 303 dials a number as illustrated in FIG. 2 comprising an initial ##, an IN number, a delimiter **, and a terminating directory number. In this case, the originating switch 305 under the control of processor 307 and program 309, transmits a CCS message 327 indicating that the IN is the ICLID number. If the IN comprises a PIN and an SDN, the SDN is forwarded to the terminating station 345. The data message is received in data transceiver 336 of terminating switch 331. This number would then be forwarded to terminating station 345 for display.

If the IN is a caller's directory number and a personal identification number, the latter can be checked in the terminating switch to verify that the caller has the right to use the special directory number as an ICLID number for the call.

The term ICLID number as used herein refers to that number which is used by the terminating switching system for display at the customer's telephone (unless the number is private) and for use in connection with LASS features. Clearly, different numbers may be used for these two purposes, and the numbers separately identified in the signaling message to the terminating switching system.

Currently the CCS messages between the originating switch and the terminating switch contain a plurality of numbers including both the calling telephone number and calling card number. In order to implement this invention, only a one-byte space in the CCS message needs to be allocated to accommodate the acquired indication data identifying which number is to be used for caller identification. In the preferred embodiment, if the caller keys an identification number, that number should be transmitted in a presently unused field of the Initial Address Message (IAM) transmitted to the terminating switch.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a telephone network, a method of indicating a number for use as an incoming calling line identification (ICLID) number, comprising the steps of:
   in an originating telephone switching system, interpreting dialing signals from a calling customer to specify a choice of an ICLID number, other than the calling telephone number, for a call; and
   in a common channel signaling message from the originating system to a terminating switching system serving a called customer of said call, transmitting data including the specified ICLID number and indication data for selecting the specified number for use as by said terminating system as ICLID data for said call.

2. The method of claim 1 wherein said ICLID number for said call comprises a calling card number.

3. The method of claim 1 wherein said ICLID number for said call comprises an identification number dialed from said calling customer.

4. The method of claim 3 wherein said identification number is supplied by said customer as part of the dialing for establishing said call.

5. The method of claim 4 wherein said dialing comprises dialing an identification sequence to identify an identification number.

6. The method of claim 5 wherein said identification number comprises a special directory number and a personal identification number.

7. The method of claim 1 further comprising the step of:
   based on said indication data, selecting said specified number as an ICLID number for serving a called customer of said call.

8. In a telecommunications switching system, apparatus for processing a telephone call comprising:
   means for transmitting common channel signaling messages toward a switching system for serving a called customer of said call; and
   processor means, operative under the control of a program and responsive to a selection provided by dialing signals from a calling customer, for storing indication data for indicating which of a plurality of possible numbers is to be used as an Incoming Calling Line Identification (ICLID) number in said switching system for serving said called customer;
   said processor means, further operative under the control of said program, for inserting said indication data in a common channel signaling message to a terminating switching system for controlling ICLID signaling to a telephone station of said called customer.

9. The method of claim 1 further comprising the step of:
   prompting said calling customer to provide said dialing signals for specifying a choice of an ICLID number other than the calling telephone number.

* * * * *